United States Patent
Qiu et al.

(10) Patent No.: US 9,742,491 B2
(45) Date of Patent: Aug. 22, 2017

(54) APPARATUS AND METHOD FOR MONITORING IN-BAND OSNR

(71) Applicant: Beijing University of Posts and Telecommunications, Beijing (CN)

(72) Inventors: Jifang Qiu, Beijing (CN); Bo Yuan, Beijing (CN); Jian Wu, Beijing (CN); Yan Li, Beijing (CN); Xiaobin Hong, Beijing (CN); Hongxiang Guo, Beijing (CN); Jintong Lin, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 14/726,655

(22) Filed: Jun. 1, 2015

(65) Prior Publication Data
US 2015/0349880 A1   Dec. 3, 2015

(30) Foreign Application Priority Data

May 30, 2014   (CN) .......................... 2014 1 0240090

(51) Int. Cl.
*H04B 10/08*   (2006.01)
*H04B 17/00*   (2015.01)
*H04B 10/06*   (2006.01)
*H04B 10/079*  (2013.01)

(52) U.S. Cl.
CPC ............... *H04B 10/07953* (2013.01)

(58) Field of Classification Search
USPC ................. 398/26, 203, 208, 209; 385/2, 24
See application file for complete search history.

(56) References Cited

U.S. PATENT DOCUMENTS

| | | | | |
|---|---|---|---|---|
| 5,007,106 A | * | 4/1991 | Kahn ..................... | H04B 10/61 398/203 |
| 5,664,037 A | * | 9/1997 | Weidman ............. | G02B 6/2856 385/43 |
| 6,650,458 B1 | * | 11/2003 | Prosyk ................... | G02F 1/225 359/237 |
| 7,149,407 B1 | * | 12/2006 | Doerr ............... | H04B 10/07953 385/11 |
| 2001/0024543 A1 | * | 9/2001 | Ahmadvand ...... | G02B 6/29355 385/24 |

(Continued)

FOREIGN PATENT DOCUMENTS

EP   0728325 A4 *   7/1995   ............. G02F 1/225

OTHER PUBLICATIONS

Flood et al. "In-band OSNR monitoring using a pair of Michelson fiber interferometers" vol. 18, No. 4 / Optics Express 3618 Feb. 15, 2010.

*Primary Examiner* — David Payne
*Assistant Examiner* — Pranesh Barua
(74) *Attorney, Agent, or Firm* — Muir Patent Law, PLLC

(57) ABSTRACT

An apparatus and a method for monitoring in-band OSNR (Optical Signal-to-Noise Ratio) which monitors the in-band OSNR by using two parallel Mach-Zehnder-interferometers with different optical time delays are disclosed. The apparatus and method can be resistant to chromatic dispersion, polarization mode dispersion and polarized noise, can measure the coherence characteristics of the signal without removing the noise, and can be manufactured into a semiconductor integrated device and be applied in the future high-speed optical network.

20 Claims, 6 Drawing Sheets

(56) References Cited

U.S. PATENT DOCUMENTS

| | | | | |
|---|---|---|---|---|
| 2002/0051602 A1* | 5/2002 | Hung | ............... | G02B 6/2746 385/16 |
| 2002/0057866 A1* | 5/2002 | Hung | ............... | G02B 6/266 385/24 |
| 2003/0123878 A1* | 7/2003 | Li | ............... | G02B 6/29361 398/79 |
| 2003/0215173 A1* | 11/2003 | Hakimi | ............... | G02B 6/2706 385/15 |
| 2005/0058398 A1* | 3/2005 | Doerr | ............... | G02B 6/12007 385/39 |
| 2005/0196092 A1* | 9/2005 | Enokihara | ............... | G02F 1/2255 385/2 |
| 2006/0098980 A1* | 5/2006 | Lee | ............... | H04B 10/071 398/26 |
| 2007/0065075 A1* | 3/2007 | Berger | ............... | G01J 3/02 385/37 |
| 2007/0086699 A1* | 4/2007 | Doerr | ............... | G02B 6/12007 385/24 |
| 2008/0025733 A1* | 1/2008 | Nazarathy | ............... | H04B 10/677 398/209 |
| 2008/0144989 A1* | 6/2008 | Sakurai | ............... | G02F 1/3132 385/3 |
| 2008/0166083 A1* | 7/2008 | Doerr | ............... | H04B 10/5561 385/3 |
| 2009/0074428 A1* | 3/2009 | Liu | ............... | H04B 10/2513 398/208 |
| 2010/0231817 A1* | 9/2010 | Ide | ............... | G02F 1/13471 349/18 |
| 2010/0296821 A1* | 11/2010 | Elbers | ............... | H04B 10/677 398/203 |
| 2011/0217045 A1* | 9/2011 | Watson | ............... | G02B 6/12002 398/79 |
| 2011/0311222 A1* | 12/2011 | Nakamura | ............... | H04B 10/07953 398/26 |
| 2016/0142133 A1* | 5/2016 | Chitgarha | ............... | H04J 14/0227 398/26 |

\* cited by examiner

APPARATUS AND METHOD FOR MONITORING IN-BAND OSNR

CROSS-REFERENCE TO RELATED APPLICATIONS

The present application claims priority under 35 U.S.C. 119 to Chinese Patent Application No. 201410240090.1, filed on May 30, 2014, the entire contents of which are incorporated herein by reference.

BACKGROUND

1. Field

The present disclosure relates to the technical field of optical communications, and more particularly to a method for monitoring in-band OSNR (Optical Signal-to-Noise Ratio) based on a parallel asymmetric Mach-Zehnder interferometer.

2. Description of the Related Art

Since the OSNR (Optical Signal-To-Noise-Ratio) is associated with the error rate of the optical signal, the OSNR is one of important diagnostic factors for the health of signal, thus measuring the OSNR is an important diagnostic means for WDM (Wavelength-Division-Multiplexing) systems. Traditional OSNR monitoring on a certain channel is achieved by measuring the level of noise between two channels and performing linear interpolation to determine the noise on the frequency of the channel, i.e., out-band OSNR monitoring. However, with the application of OADMs (optical-add-drop-multiplexer), variant damages may accumulate in the parameters of channels of WDM due to different transmission links, thus causing the out-band OSNR monitoring ineffective. As shown in FIG. 1, FIG. 1(a) illustrates different levels of noise between channels due to different transmission links, and the optical filter or multiplexing/de-multiplexing in FIG. 1(b) can filter out the out-band noise, but cannot filter out the in-band noise. After transmission through different links, the channels may have different OSNRs, and the in-band OSNR can be quite different from the out-band OSNR.

Thus, there are proposed many techniques for monitoring in-band OSNR, which can be generally classified into polarization nulling methods, waveform sampling methods, signal spectral analysis methods, methods based on nonlinear Kerr effect and methods based on optical interferometry.

OSNR monitoring based on polarization nulling methods is a simple, cost-saving and effective monitoring method for OSNRs and this method will not be limited by the transmission speed and the modulation format. However, it has a serious defect that in its assumptions the data signal of the signal to be measured is considered as completely polarized and the noise is considered as un-polarized, however in practice, owing to several uncertain factors in optical fiber in transmission link such as birefringence, polarization-dependent gains and polarization-dependent loss etc., the data signal can be "depolarized" or the noise can be partially polarized, in which case that the operator cannot tell the difference between the data signal and the noise, and then the accuracy of the measurement cannot be guaranteed which requires further improvement.

Waveform sampling method is another technique that analyzes the waveform of the signal to be measured and analyzes sampled data statistically to assess OSNRs of the signal to be measured, which actually belongs to the field of electrical monitoring but can also be considered as in the field of optical performance monitoring since the sampling part can be implemented in the optical field. Waveform sampling can be further classified into synchronous sampling, asynchronous sampling and delay-tap sampling. Among these methods, the synchronous sampling is a quite mature technique that can synchronously monitor the information of the signal such as SNR, time jitter, quality factor, quality of eye diagram, etc., but it requires clock extraction from the signal to be measured to maintain synchronicity between the sampling and the signal. Thus, it is difficult to be applied to the future high-speed network for exponential increase of cost when the signal has a higher rate. Asynchronous sampling is one of the most studied techniques which directly performs asynchronous sampling with a low frequency on the waveform of the signal and then analyzes the sampled data statistically to monitor the properties of the signal, and it is cost-saving and has no constraint on the rate of the signal and avoids clock extraction for the signal, but requires a lot of statistical analysis and calculation in the post-processing stage, and according to current documents, its feasibility is proved in theory, complete monitoring experiments for asynchronous sampling have not been performed. Delay tap sampling is a technique without need of clock extraction, which can monitor synchronously several damages such as chromatic dispersion, polarization mode dispersion and OSNR, but its greatest drawback is that the delay of the sampling for the signals on two parts are associated with the rates of the signals which requires a precise setting; i.e., the technique is not transparent to the rate of the signal and requires further study and improvement. In general, waveform sampling method is a statistical analysis for waveform of the signal and thus is relatively more effective on monitoring for amplitude modulated signals. Currently, it is still rare to see the waveform sampling method for monitoring the phase modulated signals, so the applicable modulation formats related therewith are limited.

Signal spectral analysis method is another technique which monitors the high-speed signals by smartly monitoring the low-speed signals, which avoids the use of the high-speed devices and lowers the cost, but it has certain disadvantages:

(i) due to the overlap of signal spectrum between the low-frequency RF (radio frequency) signal and the Wavelength-Division-Multiplexing data signal, the low frequency signal may interfere with the data signal, and the two affect each other, and the low frequency signal has a stringent requirement for its power which must be large enough to distinguish the data signal from the noise but cannot be too large to affect the transmission and reception of the data signal;

(ii) the complexity of the system is increased since the low frequency signal is loaded onto the channel.

Methods based on a nonlinear Kerr effect include monitoring the OSNRs utilizing nonlinear effects such as four-wave mixing effect, cross phase modulation effect, parametric amplification, and two photon absorption in nonlinear devices such as semiconductor optical amplifier, highly nonlinear optical fiber and other nonlinear waveguide devices.

Methods based on a nonlinear Kerr effect have typical advantages such as all optical operation and high transmission rate, but also have drawbacks. Due to the adoption of the nonlinear effects, it has a higher power requirement for the signal to be measured and even a precise alignment for the phase of the signal to be measured, and thus its application is limited.

Methods based on interferometry can tell the data signal from the noise based on the different coherence characteristics of the data signal and the noise (the data signal has coherence while the noise has no coherence or very poor coherence). Since the coherence characteristics of the data signal and the noise cannot be affected by the factors such as chromatic dispersion, polarization mode dispersion and the degree of polarization of the noise, the OSNR monitoring based on interferometry can be resistant to other damages, and thus it is an effective and reliable OSNR technique which becomes one of the most promising ones among the current monitoring techniques.

The typical structure for OSNR monitoring based on interferometry is a Mach-Zehnder interferometer as shown in FIG. 2, which is comprised of two 3 dB couplers and two interference arms. Since this technique needs to obtain the autocorrelation function of the data signal, which requires calibration on each of the optical transmitters. It usually requires turning off the noise in the channel, which is practically impossible.

This problem can be solved by a pair of Michelson interferometers having different time delays as shown in FIG. 3, and as described in E. Flood et al., "In-band OSNR monitoring using a pair of Michelson fiber interferometers", *Optics Express, Vol.* 18, 2010, No. 4, pp. 3618-3624, which is incorporated herein by reference its entirety. However, the solution of Michelson interferometers has a poor stability due to its huge structure, which is all fiber, and has limitations such as inability to integrate, easiness to be influenced by environment and high power of input optical light.

SUMMARY

The disclosed embodiments are proposed to address above mentioned technical issues existing in the related art, wherein different aspects of the disclosed embodiments aim to provide an apparatus and method for monitoring in-band OSNR which is resistant to chromatic dispersion, polarization mode dispersion and degree of polarization of noise, has ability to integrate and can be applied in future high speed optical network.

In one aspect of the present invention, an apparatus for monitoring in-band OSNR (Optical Signal-to-Noise Ratio) configured by a parallel Mach-Zehnder interferometer is provided, including: a 1×3 coupler, at the input terminal of which is a Wavelength-Division-Multiplexing optical signal to be monitored; a first delay arm, a second delay arm and a common arm, each of which is connected to one of the three output terminals of the coupler wherein the common arm is comprised of a phase modulator and a first 3 dB coupler which are connected in series, the first and second delay arms having different values of time delay; a second 3 dB coupler and a third 3 dB coupler, wherein the two input terminals of the second coupler are connected to the output terminal of the first delay arm and one of the two output terminals of the first coupler respectively, and the two input terminals of the third coupler are connected to the output terminal of the second delay arm and the other of the two output terminals of the first coupler respectively; and a first optical power meter and a second optical power meter, connected to the output terminals of the second coupler and the third coupler respectively.

In a second aspect of the present invention, an apparatus for monitoring in-band OSNR (Optical Signal-to-Noise Ratio) configured as a semiconductor integrated device is provided, comprising: a 1×3 coupler, at the input terminal of which is a Wavelength-Division-Multiplexing optical signal to be monitored; a first delay arm, a second delay arm and a common arm, each of which is connected to one of the three output terminals of the 1×3 coupler, wherein the common arm is comprised of a phase modulator and a first 3 dB coupler which are connected in series, the first and second delay arms having different values of time delay; a second 3 dB coupler and a third 3 dB coupler, wherein the two input terminals of the second coupler are connected to the output terminal of the first delay arm and one of the two output terminals of the first coupler respectively, and the two input terminals of the third coupler are connected to the output terminal of the second delay arm and the other of the two output terminals of the first coupler respectively; and a first detector and a second detector, connected to the output terminals of the second coupler and the third coupler respectively, and in the two output terminals of the first and second detectors, one output terminal is configured to output a signal, and the other output terminal is grounded.

In a third aspect of the present invention, a method for monitoring in-band OSNR (Optical Signal-to-Noise Ratio) is provided, including: Step 1: a Wavelength-Division-Multiplexing(WDM) optical signal is split into three parts of the optical signal by a 1×3 coupler; Step 2: first and third parts of the three parts of the optical signal pass a first delay arm and a second delay arm respectively, two of which have different time delays, and a second part of the three parts of the optical signal passes a common arm which composes of a phase modulator and a first 3 dB coupler which are connected in series, wherein the second part of the optical signal is phase modulated by the phase modulator when passing the common arm, and then the phase modulated second part of the optical signal from the common arm interferes respectively with the first and third parts of the optical signal, thereby obtaining the maximum value and the minimum value of the output power of each of two parallel Mach-Zehnder interferometers; Step 3: calculating the visibility of each of the two parallel Mach-Zehnder interferometers with the maximum value and the minimum value of the output power of each of the two parallel Mach-Zehnder interferometers, i.e., $$\mu_1 = (P_{max1} - P_{min1})/(P_{max1} + P_{min1})$$

$$\mu_2 = (P_{max2} - P_{min2})/(P_{max2} + P_{min2}),$$

wherein $P_{max1}$, $P_{min1}$, $P_{max2}$ and $P_{min2}$ are the maximum value and the minimum value of the output power of each of the two parallel Mach-Zehnder interferometers respectively, and $\mu_1$ and $\mu_2$ are the visibility of each of the two parallel Mach-Zehnder interferometers respectively; Step 4: calculating the noise-to-signal ratio r of the WDM optical signal according to the visibility of each of the two parallel Mach-Zehnder interferometers and the normalized autocorrelation function of the data signal and the normalized autocorrelation function of the noise, i.e., $$r = \frac{\gamma_s(\Delta\tau_1) - \mu_1}{\mu_1 - \gamma_n(\Delta\tau_1)} = \frac{\gamma_s(\Delta\tau_2) - \mu_2}{\mu_2 - \gamma_n(\Delta\tau_2)}$$

wherein $\gamma_s(\Delta\tau_1)$ and $\gamma_s(\Delta\tau_2)$ are the autocorrelation function of the data signal of each of the two parallel Mach-Zehnder interferometers respectively; $\gamma_n(\Delta\tau_1)$ and $\gamma_n(\Delta\tau_2)$ are the autocorrelation function of the noise of each of the two parallel Mach-Zehnder interferometers respectively, and $\Delta\tau_1$, $\Delta\tau_2$ are different time delays of the first and second delay arms; Step 5: calculating the OSNR according to the noise-to-signal ratio r of the WDM optical signal, $$OSNR = 10\log_{10}\left(\frac{1}{r}\frac{NEB}{0.1 \text{ (nm)}}\right)$$
$$= -10\log_{10}(r) + 10\log_{10}\left(\frac{NEB}{0.1 \text{ (nm)}}\right)$$

wherein NEB is noise equivalent bandwidth.

BRIEF DESCRIPTION OF THE FIGURES

In order to more clearly illustrate the technical aspects in the embodiments of the present invention or the prior art, a brief description of the drawings used in the description of the embodiments is given. These drawings are used to illustrate only some embodiments of the present invention, and it is possible for those skilled in the art to derive other drawings and explanations based on these drawings that are within the scope of the present invention.

FIGS. 1(a)-1(b) illustrate the OSNRs in respective channels after transmission through different links in method for out-band OSNR monitoring in prior art and the differences between in-band and out-band OSNRs;

FIGS. 6(a) and 6(b) illustrates a comparison between the actual OSNR and the OSNR measured by the apparatus and method for in-band OSNR monitoring, according to certain embodiments of the present invention;

FIGS. 7(a)-7(d) illustrates an assessment of the influence of chromatic dispersion and polarization mode dispersion on the results of OSNR monitoring by the apparatus and method for in-band OSNR monitoring, according to certain embodiments of the present invention;

FIGS. 8(a)-8(c) illustrates an assessment of the influence of degree of unbalance of the couplers on the results of OSNR monitoring by the apparatus and method for in-band OSNR monitoring, according to certain embodiments of the present invention; FIGS. 9(a) and 9(b) illustrates an assessment of the influence of the length deviations of each of the two delay arms on the results of OSNR monitoring by the apparatus and method for in-band OSNR monitoring, according to certain embodiments of the present invention.

DETAILED DESCRIPTION

Figure 1:
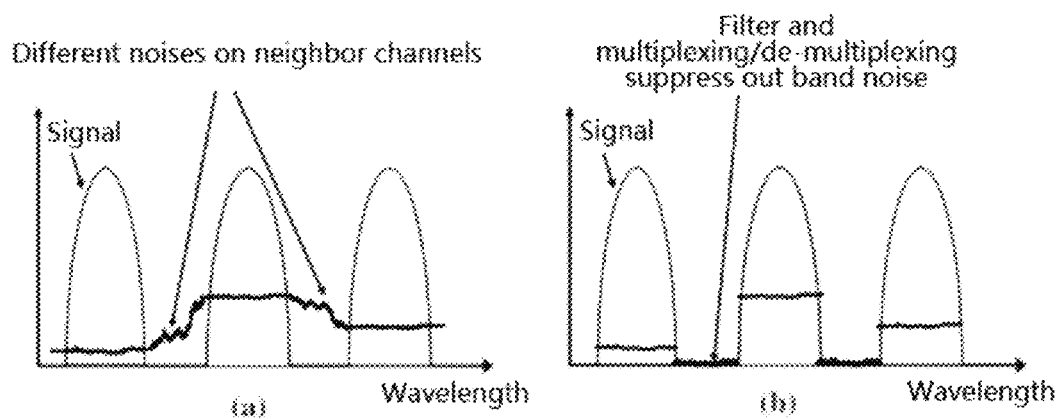
FIG. 1, including
Figure 2:
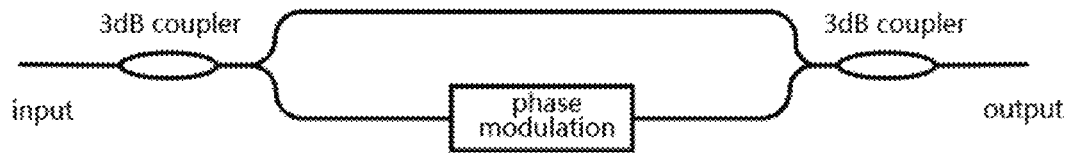
FIG. 2 illustrates the principle of Mach-Zehnder interferometer in prior art.
Figure 3:
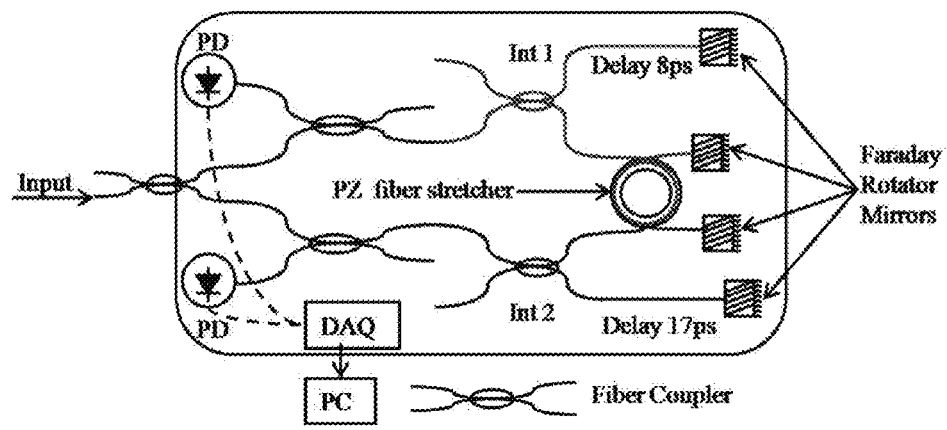
FIG. 3 illustrates a method for monitoring in-band OSNR based on a pair of Michelson interferometers in prior art.

The present disclosure will be further detailed with reference to the drawings and the embodiments which are intended for illustrating certain aspects of the present invention, and are not intended to limit the present invention. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that, although the terms first, second, third etc. may be used herein to describe various elements, components, signals, or steps, these elements, components, signals or steps should not be limited by these terms. Unless the context indicates otherwise, these terms are only used to distinguish one element, component, signal or step from another element, component, signal or step, for example as a naming convention. Thus, a first element, component, signal or step discussed below in one section of the specification could be termed a second element, component, signal or step in another section of the specification or in the claims without departing from the teachings of the present disclosure. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Terms such as "same," or "equal" as used herein when referring to structures, sizes, amounts, or other measures do not necessarily mean an exactly identical structure, size, amount, or other measure, but are intended to encompass nearly identical structures, sizes, amounts, or other measures within acceptable variations that may occur, for example, due to manufacturing processes. The term "substantially" may be used herein to reflect this meaning.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 4:
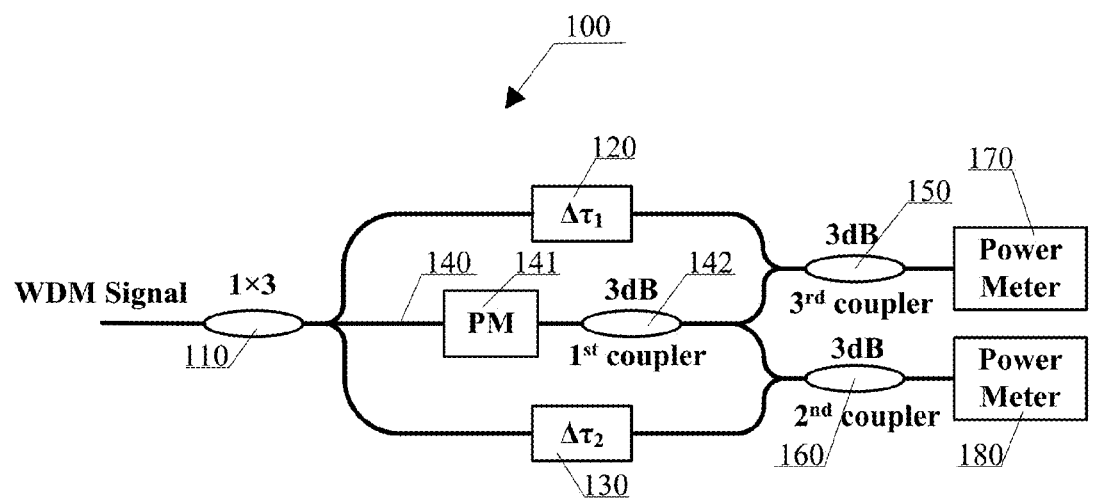
FIG. 4 illustrates a configuration of the apparatus for monitoring in-band OSNR, according to certain embodiments of the present invention.

FIG. 4 illustrates an exemplary configuration of the apparatus for monitoring in-band OSNR according to certain embodiments of the present invention. As shown in FIG. 4, an apparatus (100) for monitoring in-band OSNR (Optical Signal-to-Noise Ratio) configured by two parallel Mach-Zehnder interferometers includes:

a 1×3 coupler (110), at the input terminal of which is a Wavelength-Division-Multiplexing optical signal to be monitored; For example, optical data signals generated by a signal generator with different modulation formats as NRZ-OOK/RZ33-OOK/NRZ-DPSK/RZ33-DPSK, and noise generated by an erbium-doped optical fiber amplifier (EDFA), pass through a 3 dB coupler and then through an optical band pass filter to generate a Wavelength-Division-Multiplexing(WDM) optical signal as an input optical signal for the 1×3 coupler (110), wherein the EDFA may be connected in series with an attenuator to control the amount of noise coupled to the optical signal, so as to control the OSNR of the WDM optical signal to be monitored;

a first delay arm (120), a second delay arm (130) and a common arm (140), each of which is connected to one of the three output terminals of the coupler (110), wherein the common arm is comprised of a phase modulator (141) and a 1×2 first 3 dB coupler (142) which are connected in series, the first and second delay arms having different values of time delay; for example, the first arm (120) may have a delay of 3 ps and the second arm (130) may have a delay of 10 ps;

a second 3 dB coupler (150) and a third 3 dB coupler (160), wherein the two input terminals of the second coupler (150) are connected to the output terminal of the first delay arm (120) and one of the two output terminals of the first coupler (142) respectively, and the two input terminals of the third coupler (160) are connected to the output terminal of the second delay arm (130) and the other of the two output terminals of the first coupler (142) respectively, wherein a WDM optical signal is split into three parts of the optical signal through the 1×3 coupler (130): a first part of the optical signal passes through the first delay arm (120) to arrive at the second coupler (150), a third part of the optical signal passes through the second delay arm (130) to arrive at the third coupler (160), and a second part of the optical signal passes through the common arm (140) to be split into two separate parts to be separately transmitted to the second coupler (150) and the third coupler (160), wherein in the two separate parts split from the common arm (140), one separate part interferes with the first part of the optical signal at the second coupler (150), and the other separate part interferes with the third part of the optical signal at the third coupler (160); and a first optical power meter (170) and a second optical power meter (180), connected to the output terminals of the second coupler (150) and the third coupler (160) respectively.

In order to better guarantee the coherence between the two separate parts from the common arm (140) and the first and third parts of the optical signal, in one embodiment, the 1×3 coupler (110) has a splitting ratio of 1:2:1, wherein the common arm (140) is inputted with 50% of the optical signal, and the first delay arm (120) and the second delay arm (130) is inputted with 25% of the optical signal respectively.

The apparatus for in-band OSNR monitoring according to certain embodiments of the present invention proposes a new configuration based on two parallel Mach-Zehnder interferometers. Thus, certain embodiments tell the data signal from the noise in the OSNR monitoring based on different coherence characteristics of the data signal and the noise, and thus are resistant to chromatic dispersion, polarization mode dispersion and degree of polarization of noise and are applicable in the future high-speed optical networks. Further, the adoption of two different time delays makes it unnecessary to turn off the noise in monitoring, which is more practical.

Figure 5:
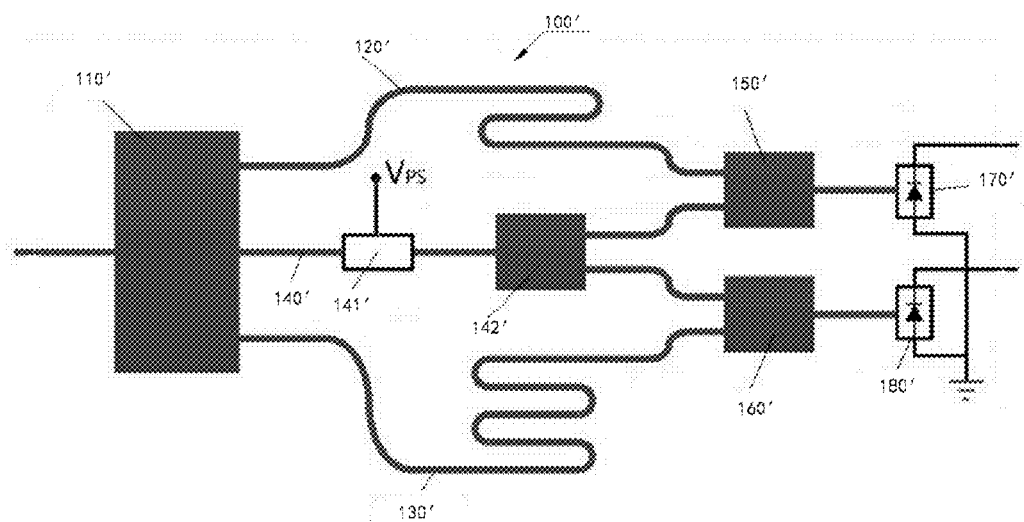
FIG. 5 illustrates an apparatus for monitoring in-band OSNR configured as a semiconductor integrated device, according to certain embodiments of the present invention.

FIG. 5 illustrates an apparatus for in-band OSNR monitoring configured as a semiconductor integrated device according to certain embodiments of the present invention. As shown in FIG. 5, an apparatus for monitoring in-band OSNR (Optical Signal-to-Noise Ratio) (100') configured as a semiconductor integrated device, comprises:

a 1×3 coupler (110'), at the input terminal of which is a WDM optical signal to be monitored;

a first delay arm (120'), a second delay arm (130') and a common arm (140'), each of which is connected to one of the three output terminals of the 1×3 coupler (110'), wherein the common arm (140') is comprised of a phase modulator (141') and a first 3 dB coupler (142') which are connected in series, the first and second delay arms having different values of time delay; for example, the first delay arm (120') may have a delay of 3 ps and the second delay arm (130') may have a delay of 10 ps;

a second 3 dB coupler (150') and a third 3 dB coupler (160'), wherein the two input terminals of the second coupler (150') are connected to the output terminal of the first delay arm (120') and one of the two output terminals of the first coupler (142') respectively, and the two input terminals of the third coupler (160') are connected to the output terminal of the second delay arm (130') and the other of the two output terminals of the first coupler (142') respectively; and a first detector (170') and a second detector (180'), connected to the output terminals of the second coupler (150') and the third coupler (160') respectively, and in the two output terminals of the first and second detectors, one output terminal is configured to output a signal, and the other output terminal is grounded.

In certain embodiments, the coupler (110'), the first coupler (142'), the second coupler (150') and the third coupler (160') are multi-mode interference couplers.

The integration of the apparatus (100) for monitoring OSNR can effectively lower the power consumption and the cost and can be applied in future high-speed optical networks.

A method for monitoring in-band OSNR (Optical Signal-to-Noise Ratio) is provided, including a number of steps.

For example, in step 1, a WDM optical signal is split into three parts of the optical signal by a 1×3 coupler; Preferably, the 1×3 coupler (110) has a splitting ratio of 1:2:1, wherein the common arm is inputted with 50% of the optical signal, and the first delay arm and the second delay arm is respectively inputted with 25% of the optical signal, such that, when optical interferences occur at the coupler (550) and the coupler (560), optical power is minimized when destructive interference occurs and optical power is maximized when constructive interference occurs, thus the accuracy of the OSNR monitoring is improved.

In step 2, first and third parts of the three parts of the optical signal pass the first delay arm and the second delay arm respectively both of which have different time delays, and a second part of the three parts of the optical signal passes a common arm which composes of a phase modulator and a first 3 dB coupler which are connected in series. The second part of the optical signal may be phase modulated by the phase modulator when passing the common arm, and then the phase modulated second part of the optical signal from the common arm interferes respectively with the first and third parts of the optical signal, thereby obtaining the maximum value and the minimum value ($P_{max1}$, $P_{min1}$, $P_{max2}$ and $P_{min2}$) of the output power of each of two parallel Mach-Zehnder interferometers. For example, the optical signal may be modulated by the phase modulator with an integer multiply of π. In certain embodiments, the phase modulator is driven by an electrical clock signal which has a frequency lower than 1 MHz.

Step 3 includes calculating the visibility ($\mu_1$ and $\mu_2$) of each of the two parallel Mach-Zehnder interferometers with the maximum value and the minimum value ($P_{max1}$, $P_{min1}$, $P_{max2}$ and $P_{min2}$) of the output power of each of the two parallel Mach-Zehnder interferometers, i.e., $$\mu_1 = (P_{max1} - P_{min1})/(P_{max1} + P_{min1})$$

$$\mu_2 = (P_{max2} - P_{min2})/(P_{max2} + P_{min2})$$

Step 4 includes calculating the noise-to-signal ratio r of the WDM optical signal according to the visibility ($\mu_1$ and $\mu_2$) of each of the two parallel Mach-Zehnder interferometers and the normalized autocorrelation function of the data signal and the normalized autocorrelation function of the noise, i.e., $$r = \frac{\gamma_s(\Delta\tau_1) - \mu_1}{\mu_1 - \gamma_n(\Delta\tau_1)} = \frac{\gamma_s(\Delta\tau_2) - \mu_2}{\mu_2 - \gamma_n(\Delta\tau_2)} \quad (1)$$

wherein $\gamma_s(\Delta\tau_1)$ and $\gamma_s(\Delta\tau_2)$ are the autocorrelation function of the data signal of each of the two parallel Mach-Zehnder interferometers respectively; $\gamma_n(\Delta\tau_1)$ and $\gamma_n(\Delta\tau_2)$ are the autocorrelation function of the noise of each of the two parallel Mach-Zehnder interferometers respectively, specifically, $\gamma_s(\Delta\tau_1) = 1 - \Sigma_{i=1}^{I} c_i \Delta\tau_1^{2i}$, and when I=1, $\gamma_s(\Delta\tau_1)$ is approximated with a parabolic curve, and then it is approximated as $\gamma_s(\Delta\tau_1) \approx 1 - c_1 \Delta\tau_1^2$; likewise, $\gamma_s(\Delta\tau_2)$ is approximated with a parabolic curve, and then it is approximated as $\gamma_s(\Delta\tau_2) \approx 1 - c_1 \Delta\tau_2^2$. From this we can see that turning off the noise becomes unnecessary in the monitoring. By substituting $\gamma_s(\Delta\tau_1)$ and $\gamma_s(\Delta\tau_2)$ into equation (1), we can get the following two equations:

$$c_1 \Delta\tau_1^2 + r(\mu_1 - \gamma_n(\Delta\tau_1)) = 1 - \mu_1 \quad (2)$$

$$c_1 \Delta\tau_2^2 + r(\mu_2 - \gamma_n(\Delta\tau_2)) = 1 - \mu_2 \quad (3)$$

wherein $\Delta\tau_1$, $\Delta\tau_2$ are different time delays of the first and second delay arms, and $c_1$ is a constant; according to the above two equations, solutions of r and $c_1$ can be solved.

Step 5: calculating the OSNR according to the noise-to-signal ratio r of WDM optical signal, specifically, $$OSNR = 10\log_{10}\left(\frac{1}{r} \frac{NEB}{0.1 \text{ (nm)}}\right)$$
$$= -10\log_{10}(r) + 10\log_{10}\left(\frac{NEB}{0.1 \text{ (nm)}}\right)$$

wherein NEB is noise equivalent bandwidth.

In order to better ensure the accuracy of measurement of the semiconductor integrated device of the various embodiments, a method for monitoring in-band OSNR may further include: measuring the influence of the degree of unbalance of the 3 dB couplers on the results of the OSNR monitoring, which will be described in detail with reference to FIG. 8 in the following.

Further, a method according to certain embodiments of the present invention further comprises the length deviation of each of the two delay arms on the OSNR monitoring, which will be described in detail with reference to FIG. 9 in the following.

Figure 6:
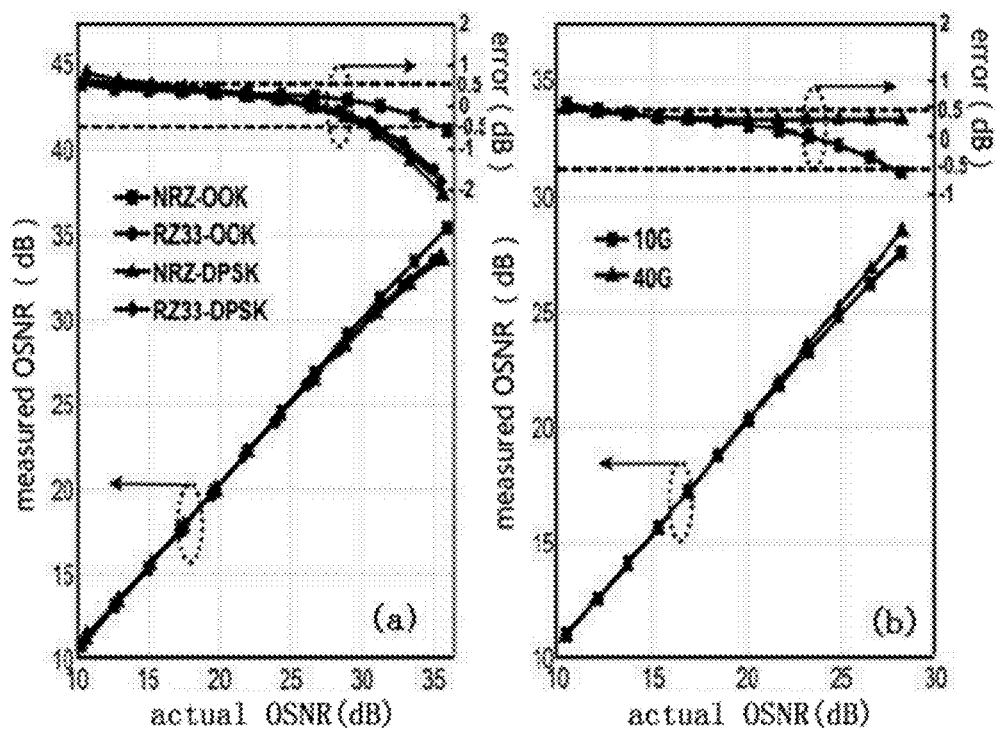
FIG. 6, including

FIG. 6 illustrates the comparison between the actual OSNR and the measured OSNR for different signals without any crosstalk (chromatic dispersion or polarization mode dispersion) according to certain embodiments, in which the horizontal axis represents the actual OSNR in the unit of dB, the left vertical axis represents the measured OSNR in the unit of dB, and the right vertical axis represents the error of the measured OSNR from the actual OSNR in the unit of dB. FIG. 6(a) illustrates the result of simulation for the signal of 10 Gb/s NRZ-OOK/RZ33-OOK/NRZ-DPSK/RZ33-DPSK, and FIG. 6(b) illustrates the result of simulation for the input signal of 40 Gbaud 16QAM and the input signal of 40 Gb/s NRZ-OOK/RZ33-OOK/NRZ-DPSK/RZ33-DPSK, wherein the optical power for the signals is kept at 1 mW, and the delay values for each of the two delay arms is $\Delta\tau_1=3$ ps and $\Delta\tau_2=10$ ps respectively. It can be seen from FIG. 6 that, for OOK and DPSK signals, the OSNR can be measured in the range of 10~30 dB with an error within ±0.5 dB and for 16 QAM signals, the OSNR can be measured in the range of 10~28 dB with an error within ±0.5 dB. From the above we can see that the apparatus and method of the present invention is effective for OSNR monitoring.

Figure 7:
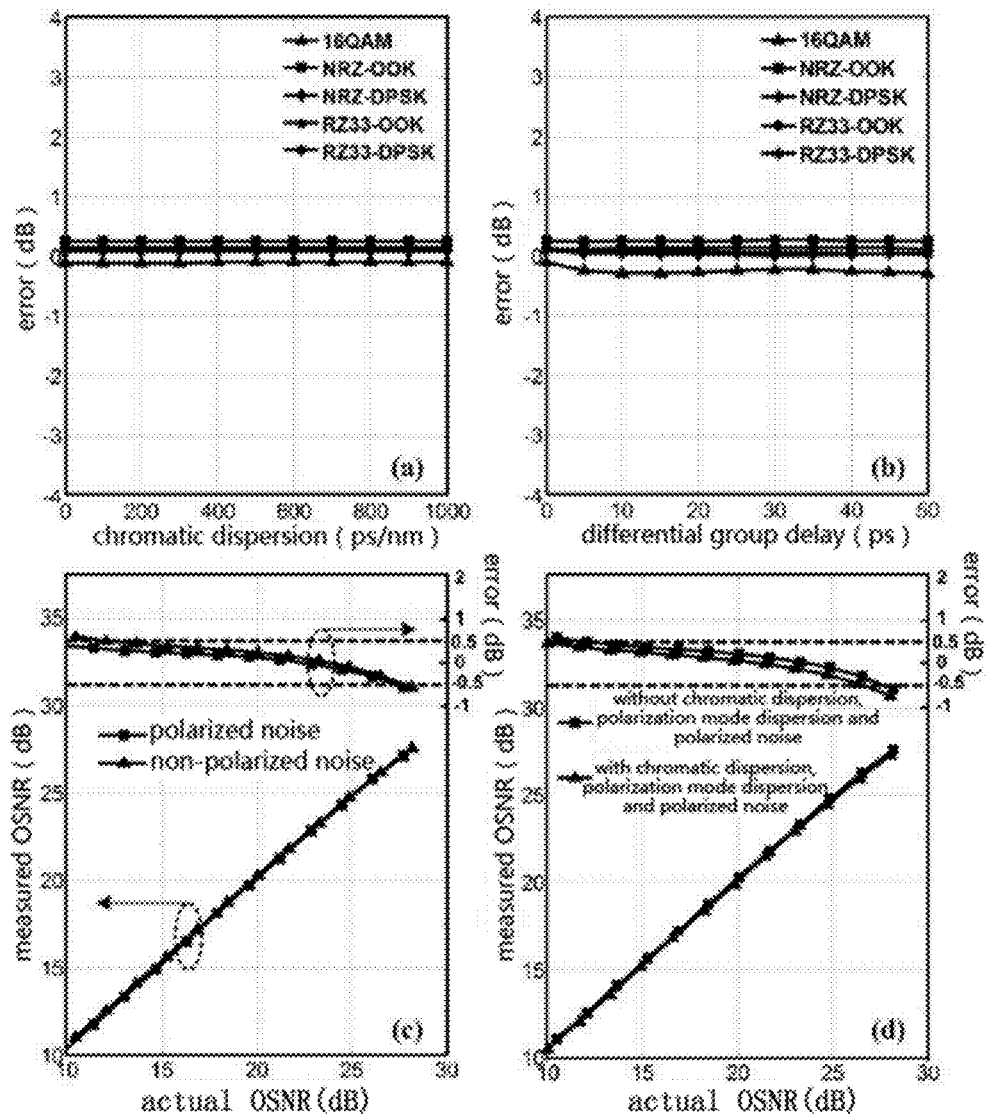
FIG. 7, including

FIG. 7 illustrates the assessment of the influence of chromatic dispersion, polarization mode dispersion and degree of polarization of noise on OSNR monitoring according to certain embodiments of the present invention, in which the signal sources are a 40 Gbaud 16 QAM signal and a 10 Gb/s NRZ-OOK/RZ33-OOK/NRZ-DPSK/RZ33-DPSK signal. FIG. 7(a) illustrates the measured result and error of OSNR with chromatic dispersion of 0~1000 ps/nm, and FIG. 7(b) illustrates the measured result and error of OSNR monitoring as the differential group delay (first order polarization mode dispersion) changes from 0 to 50 ps, and FIG. 7(c) illustrates the result of measurement for 40 Gbaud 16 QAM signals when the noise is un-polarized, partially polarized and completely polarized, and FIG. 7(d) illustrates the result of OSNR monitoring when chromatic dispersion is 600 ps/nm, the differential group delay is 50 ps and polarized noise is added. From the above figures we can see that the influence of chromatic dispersion, polarization mode dispersion and degree of polarization of noise on OSNR monitoring can be negligible.

Figure 8:
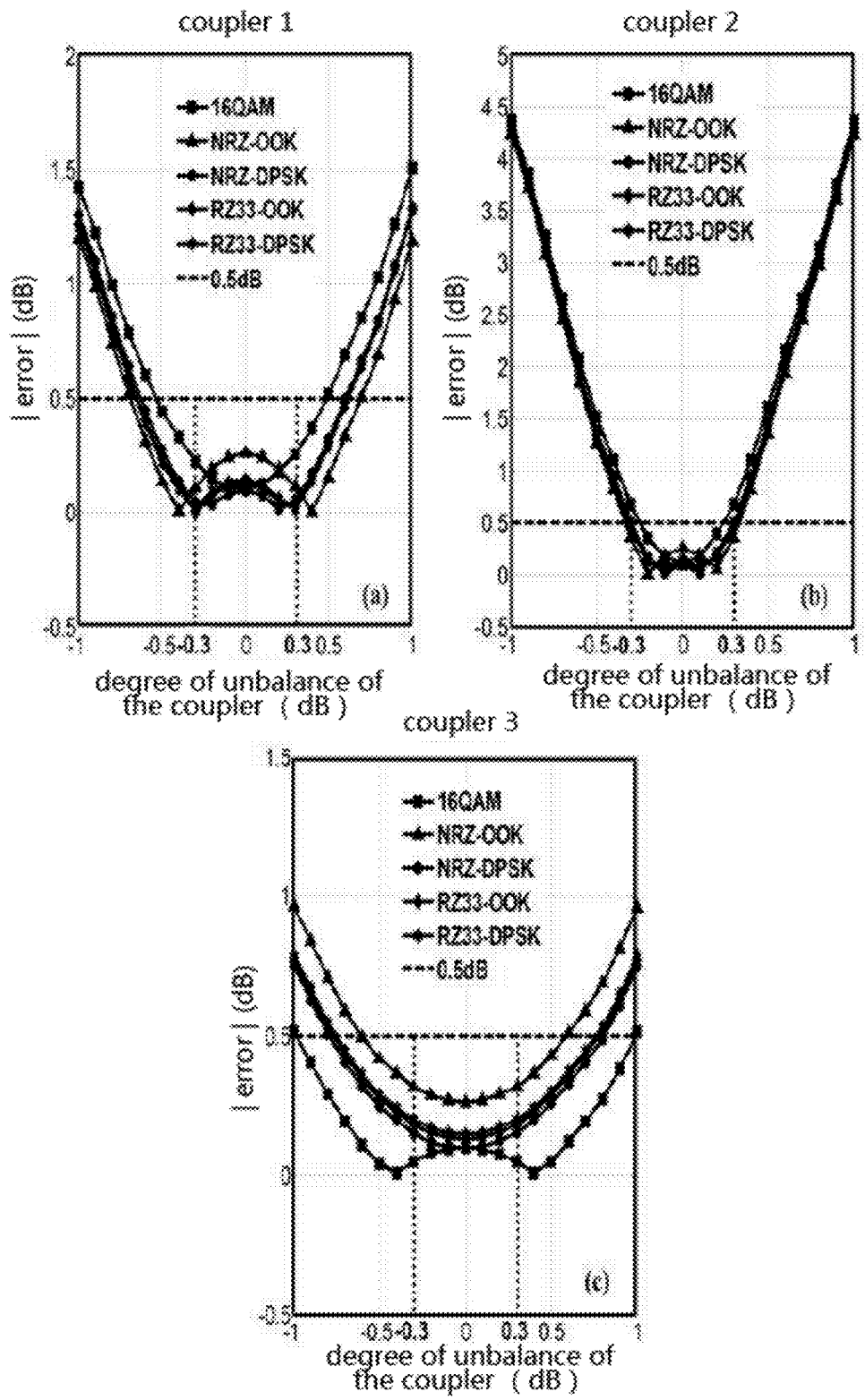
FIG. 8, including

FIG. 8 illustrates the influence of the degree of unbalance of the 3 dB couplers on OSNR monitoring according to certain embodiments of the present invention, wherein the horizontal axis represents the degree of unbalance of the coupler in the unit of dB, and the vertical axis represents the error of the measured OSNR from the actual OSNR in the unit of dB. FIG. 8(a) illustrates the influence of the degree of unbalance of a 1×2 first 3 dB coupler on OSNR monitoring, FIG. 8(b) illustrates the influence of the degree of unbalance of a second 3 dB coupler on OSNR monitoring, and FIG. 8(c) illustrates the influence of the degree of unbalance of a third 3 dB coupler on OSNR monitoring, and the signal sources are a 40 GBaud 16 QAM signal and a 10 Gb/s NRZ-OOK/RZ33-OOK/NRZ-DPSK/RZ33-DPSK signal. It can be seen from FIG. 8 that the tolerance of the degree of unbalance is larger than ±0.3 dB all the time when it is guaranteed that the error is less than ±0.5 dB for the result of OSNR monitoring for all the signals. The degree of unbalance of the coupler in related art can be ±0.2 dB which is less than the tolerance (±0.3 dB) of the degree of unbalance for all the couplers in the apparatus of the present invention, therefore, the apparatus according to certain embodiments of the present invention can be manufactured into a semiconductor integrated device.

Figure 9:
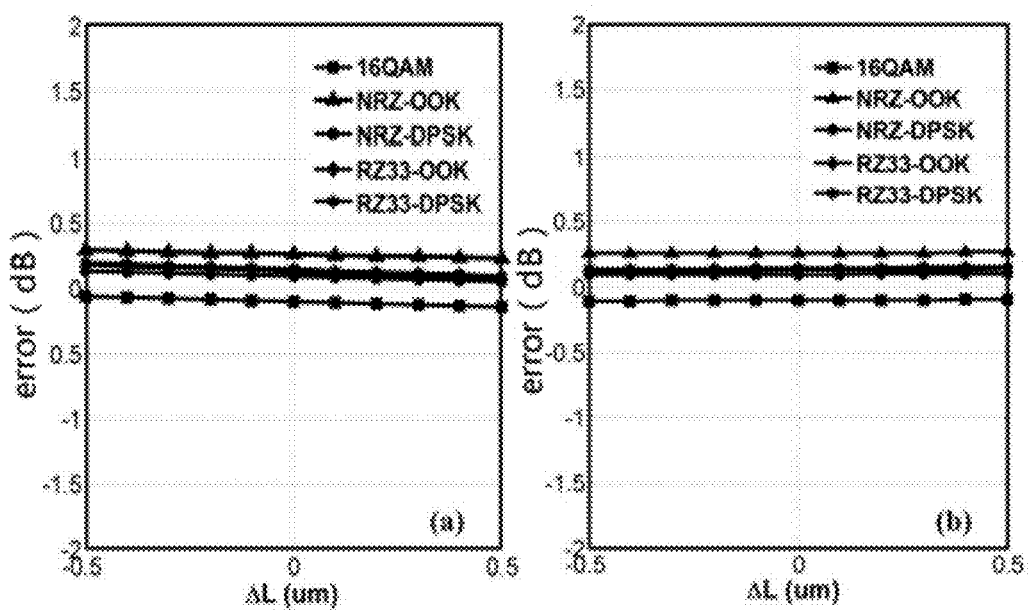
FIG. 9, including

FIG. 9 illustrates the influence of the length deviation of each of two delay arms on the result of OSNR monitoring according to certain embodiments of the present invention. FIG. 9(a) illustrates the influence of the length deviation of the first delay arm on the result of OSNR monitoring, wherein the horizontal axis represents the length deviation of the first delay arm in the unit of µm, and the vertical axis represents the error of the measured OSNR from the actual OSNR in the unit of dB, and FIG. 9(b) illustrates the influence of the length deviation of the second delay arm on the result of OSNR monitoring, wherein the horizontal axis represents the length deviation of the second delay arm in the unit of µm, and the vertical axis represents the error of the measured OSNR from the actual OSNR in the unit of dB. It can be seen from FIG. 9 that, when the length deviations for each of the two delay arms are within ±0.5 µm, the result of OSNR monitoring is not influenced by the length deviations of the delay arms; and the deviations in manufacture of semiconductor devices can be ≤±0.5 µm (ΔL≤±0.5 µm), thus it is further proved that the apparatus according to certain aspects of the present invention can be made into semiconductor integrated devices.

The apparatus and method for in-band OSNR monitoring according to various aspects of the present invention performs in-band OSNR monitoring with two parallel Mach-Zehnder interferometers having different time delays. Various aspects of the present invention tell the data signal from the noise in the OSNR monitoring based on different coherence characteristics of the data signal and the noise, and thus are resistant to chromatic dispersion, polarization mode dispersion and degree of polarization of noise and is applicable in the future high-speed optical network. Secondly, the adoption of two different time delays makes it unnecessary to turn off the noise in monitoring, which is more practical. Thirdly, aspects of the present invention have integratability which is promising in commercial mass production.

The above description is only used for illustrating various embodiments of the present invention rather than limiting the present invention. Although the present disclosure has been described in detail with reference to the embodiments, those skilled in the art would understand that, without departing from the spirit and scope of the present disclosure, various combinations, alterations or substitutions can be made, which should be understood as included in the protective scope of the claims.

What is claimed is:

1. An apparatus for monitoring in-band OSNR (Optical Signal-to-Noise Ratio) configured by a parallel Mach-Zehnder interferometer, comprising:
   a 1×3 coupler, at the input terminal of which is a Wavelength-Division-Multiplexing (WDM) optical signal to be monitored;
   a first delay arm, a second delay arm and a common arm, each of which is connected to one of the three output terminals of the coupler, wherein the common arm is comprised of a phase modulator and a first 3 dB coupler which are connected in series, the first and second delay arms having different values of time delay;
   a second 3 dB coupler and a third 3 dB coupler, wherein the two input terminals of the second coupler are connected to the output terminal of the first delay arm and one of the two output terminals of the first coupler respectively, and the two input terminals of the third coupler are connected to the output terminal of the second delay arm and the other of the two output terminals of the first coupler respectively; and
   a first optical power meter and a second optical power meter, connected to the output terminals of the second coupler and the third coupler respectively,
   wherein the first delay arm provides a first optical signal path to transmit a first part of the optical signal to be monitored to the second 3 dB coupler,
   wherein the second delay arm provides a third optical path to transmit a third part of the optical signal to be monitored to the third 3 dB coupler, and
   wherein the common arm provides a second optical signal path that is split to transmit a first portion of a second part of the optical signal to be monitored to the second 3 dB coupler to interfere with the first part of the optical signal to be monitored at the second 3 dB coupler, and to transmit a second portion of a second part of the optical signal to be monitored to the third 3 dB coupler to interfere with the third part of the optical signal to be monitored at the third 3 dB coupler.

2. The apparatus of claim 1, wherein the 1×3 coupler has a splitting ratio of 1:2:1, wherein the common arm is inputted with 50% of the optical signal, and the first delay arm and the second delay arm is inputted with 25% of the optical signal respectively.

3. The apparatus of claim 1, wherein the first delay arm has a time delay of 3 ps and the second delay arm has a time delay of 10 ps.

4. An apparatus for monitoring in-band OSNR (Optical Signal-to-Noise Ratio) configured as a semiconductor integrated device, comprising:
   a 1×3 coupler, at the input terminal of which is a Wavelength-Division-Multiplexing optical signal to be monitored;
   a first delay arm, a second delay arm and a common arm, each of which is connected to one of the three output terminals of the 1×3 coupler, wherein the common arm is comprised of a phase modulator and a first 3 dB coupler which are connected in series, the first and second delay arms having different values of time delay;
   a second 3 dB coupler and a third 3 dB coupler, wherein the two input terminals of the second coupler are connected to the output terminal of the first delay arm and one of the two output terminals of the first coupler respectively, and the two input terminals of the third coupler are connected to the output terminal of the second delay arm and the other of the two output terminals of the first coupler respectively; and
   a first detector and a second detector, connected to the output terminals of the second coupler and the third coupler respectively, and in the two output terminals of the first and second detectors, one output terminal is configured to output a signal, and the other output terminal is grounded,
   wherein the first delay arm provides a first optical signal path to transmit a first part of the optical signal to be monitored to the second 3 dB coupler,
   wherein the second delay arm provides a third optical path to transmit a third part of the optical signal to be monitored to the third 3 dB coupler, and
   wherein the common arm provides a second optical signal path that is split to transmit a first portion of a second part of the optical signal to be monitored to the second 3 dB coupler to interfere with the first part of the optical signal to be monitored at the second 3 dB coupler, and to transmit a second portion of a second part of the optical signal to be monitored to the third 3 dB coupler to interfere with the third part of the optical signal to be monitored at the third 3 dB coupler.

5. The apparatus of claim 4, wherein the 1×3 coupler has a splitting ratio of 1:2:1, wherein the common arm is inputted with 50% of the optical signal, and the first delay arm and the second delay arm is inputted with 25% of the optical signal respectively.

6. The apparatus of claim 4, wherein the 1×3 coupler, the first coupler, the second coupler and the third coupler are multi-mode interference couplers.

7. The apparatus of claim 4, wherein the first delay arm has a time delay of 3ps and the second delay arm has a time delay of 10 ps.

8. A method for monitoring in-band OSNR (Optical Signal-to-Noise Ratio), comprising:
Step 1: a Wavelength-Division-Multiplexing (WDM) optical signal is split into three parts of the optical signal by a 1×3 coupler;
Step 2: first and third parts of the three parts of the optical signal pass a first delay arm and a second delay arm respectively, both of which have different time delays, and a second part of the three parts of optical signal passes a common arm which composes of a phase modulator and a first 3 dB coupler which are connected in series,
wherein the second part of the optical signal is phase modulated by the phase modulator when passing the common arm, and then the phase modulated second part of the optical signal from the common arm interferes with the first and third parts of the optical signal respectively, thereby obtaining the maximum value and the minimum value of the output power of each of two parallel Mach-Zehnder interferometers;
Step 3: calculating the visibility of each of the two parallel Mach-Zehnder interferometers with the maximum value and the minimum value of the output power of each of the two parallel Mach-Zehnder interferometers, according to the equations, $$\mu_1 = (P_{max1} - P_{min1})/(P_{max1} + P_{min1}),$$

$$\mu_2 = (P_{max2} - P_{min2})/(P_{max2} + P_{min2}),$$

wherein $P_{max1}$, $P_{min1}$, $P_{max2}$ and $P_{min2}$ are the maximum value and the minimum value of the output power of each of the two parallel Mach-Zehnder interferometers respectively, and $\mu_1$ and $\mu_2$ are the visibility of each of the two parallel Mach-Zehnder interferometers respectively;
Step 4: calculating the noise-to-signal ratio r of the WDM optical signal according to the visibility of each of the two parallel Mach-Zehnder interferometers, the normalized autocorrelation function of the data signal and the normalized autocorrelation function of the noise, $$r = \frac{\gamma_s(\Delta\tau_1) - \mu_1}{\mu_1 - \gamma_n(\Delta\tau_1)} = \frac{\gamma_s(\Delta\tau_2) - \mu_2}{\mu_2 - \gamma_n(\Delta\tau_2)}$$

wherein $\gamma_s(\Delta\tau_1)$ and $\gamma_s(\Delta\tau_2)$ are the autocorrelation functions of the data signal of each of the two parallel Mach-Zehnder interferometers respectively; $\gamma_n(\Delta\tau_1)$ and $\gamma_n(\Delta\tau_2)$ are the autocorrelation functions of the noise of each of the two parallel Mach-Zehnder interferometers respectively, and $\Delta\tau_1$, $\Delta\tau_2$ are different time delays of the first and second delay arms in the two parallel Mach-Zehnder interferometers;

Step 5: calculating the OSNR according to the noise-to-signal ratio r of the WDM optical signal to be monitored, $$OSNR = 10\log_{10}\left(\frac{1}{r}\frac{NEB}{0.1 \text{ (nm)}}\right)$$

$$= -10\log_{10}(r) + 10\log_{10}\left(\frac{NEB}{0.1 \text{ (nm)}}\right)$$

wherein NEB is noise equivalent bandwidth.

9. The method of claim 8, further comprising:
the splitting ratio of the 1×3 coupler is 1:2:1, wherein the common arm is inputted with 50% of the optical signal, and each of the first and second delay arms is inputted with 25% of the optical signal.

10. The method of claim 8, further comprising:
measuring the influence of the degree of unbalance of the 3 dB couplers on the performance of the OSNR monitor.

11. The method of claim 10, wherein when the error of the monitored OSNR is less than ±0.5 dB, the tolerance of the degree of unbalance of all 3 dB couplers is larger than ±0.3 dB all the time.

12. The method of claim 8, further comprising:
measuring the influence of the length deviation of each of the first and second delay arms on the performance of the OSNR monitor.

13. The method of claim 12, wherein the length deviation of each of the first and second delay arms is within ±0.5 μm, which does not affect the result of OSNR monitor.

14. The method of claim 8, wherein the delay value of the first delay arm is set as 3 ps, and the delay value of the second delay arm is set as 10 ps.

15. The method of claim 8, wherein in step 2, the WDM optical signal is modulated by the phase modulator with an integer multiply of π.

16. The method of claim 15, wherein in step 2, the phase modulator is driven by an electrical clock signal which has a frequency lower than 1 MHz.

17. The method of claim 8, wherein the autocorrelation functions of the data signal of each of the two parallel Mach-Zehnder interferometers can be approximated with parabolic curves as follows:

$$\gamma_s(\Delta\tau_1) \approx 1 - c_1\Delta\tau_1^2$$

$$\gamma_s(\Delta\tau_2) \approx 1 - c_1\Delta\tau_2^2$$

wherein $c_1$ is a constant.

18. A method for monitoring in-band OSNR (Optical Signal-to-Noise Ratio), comprising:
splitting a Wavelength-Division-Multiplexing (WDM) optical signal into three parts of the optical signal by a 1×3 coupler;
transmitting first and third parts of the three parts of the optical signal respectively through a first delay arm and a second delay arm having a different time delay than the first delay arm, and transmitting a second part of the three parts of optical signal through a common arm which comprises a phase modulator and a first coupler connected in series,
wherein the second part of the optical signal is phase modulated by the phase modulator when passing through the common arm,
wherein part of the phase modulated second part of the optical signal of the common arm from the first coupler interferes with the first part of the optical signal output from the first delay arm at a second coupler, and another part of the phase modulated second part of the optical signal of the common arm from the first coupler interferes with the third part of the optical signal at a third coupler, thereby providing an output power signal of each of two parallel Mach-Zehnder interferometers;

determining a noise to signal ratio of the WDM optical signal based upon detecting the output power signals of each of the two parallel Mach-Zehnder interferometers; and calculating the OSNR according to the noise-to-signal ratio of the WDM optical signal to be monitored.

19. The method of claim 18,
wherein detecting output power signals of each of the parallel Mach-Zehnder interferometers comprises obtaining a maximum value and a minimum value of the output power of each of two parallel Mach-Zehnder interferometers.

20. The method of claim 18, wherein determining a noise to signal ratio of the WDM optical signal is based upon an autocorrelation of data signals of each of the two parallel Mach-Zehnder interferometers and an autocorrelation of noise of each of the two parallel Mach-Zehnder interferometers as determined from the respective detected output power signal of the two parallel Mach-Zehnder interferometers.

* * * * *